(12) United States Patent
Williams et al.

(10) Patent No.: US 7,054,764 B2
(45) Date of Patent: May 30, 2006

(54) FLOW MONITORING USING FLOW CONTROL DEVICE

(75) Inventors: Stuart Bruce Williams, Overton (GB); Jean-Philippe Trembley, Epsom (GB); Jeremy Paul Miller, Berkshire (GB)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 10/939,809

(22) Filed: Sep. 13, 2004

(65) Prior Publication Data

US 2005/0103093 A1    May 19, 2005

Related U.S. Application Data

(60) Provisional application No. 60/507,184, filed on Sep. 29, 2003.

(51) Int. Cl.
*G01F 1/00*     (2006.01)
*G01F 7/00*     (2006.01)

(52) U.S. Cl. .................................. 702/45; 73/861.04
(58) Field of Classification Search ............ 702/137; 73/61.46, 61.47
See application file for complete search history.

(56) References Cited

U.S. PATENT DOCUMENTS

| | | | |
|---|---|---|---|
| 3,635,084 A | 1/1972 | Lamphere et al. | |
| 4,168,624 A | 9/1979 | Pichon | |
| 4,272,982 A | 6/1981 | Arnold et al. | |
| 4,509,366 A | 4/1985 | Matsushita et al. | |
| 4,776,210 A * | 10/1988 | Baillie et al. | 73/861.04 |
| 4,835,456 A | 5/1989 | Liu et al. | |
| 4,881,412 A | 11/1989 | Northedge | |
| 5,400,657 A * | 3/1995 | Kolpak et al. | 73/861.04 |
| 5,679,905 A | 10/1997 | Wardle | |
| 5,861,755 A | 1/1999 | Moerk et al. | |
| 5,991,696 A | 11/1999 | McAndrew | |
| 6,422,092 B1 * | 7/2002 | Morrison et al. | 73/861.04 |

FOREIGN PATENT DOCUMENTS

EP     1 239 434     11/2002

OTHER PUBLICATIONS

Masoneilan Dresser Bulletin OZ1000 Jul. 2000, Masoneilan Control Valve Sizing Handbook, pp. 1-5.
Badger Meter, Inc. Research Control Valve, article entitled 'Valve Sizing Formulas', published May 2001.

* cited by examiner

*Primary Examiner*—Bryan Bui
*Assistant Examiner*—Demetrius Pretlow
(74) *Attorney, Agent, or Firm*—Anne B. Kiernan

(57) ABSTRACT

A method for determining the flow rate of a fluid, having a liquid fraction and a gas fraction, having the steps of: measuring the pressure and temperature of the fluid at a flow control device through which said cyrogenic fluid passes; inputting the measured pressure and $C_v$ into an algorithm; and performing a single or multi-step iteration to determine a fluid mass flow rate of the fluid through the flow control device using the algorithm that relates the mass flow rate of the fluid to the $C_v$, and mass densities of the liquid fraction and the gas fraction of the fluid which are a function of the measured pressure, and temperature. A system is also provided.

21 Claims, 5 Drawing Sheets

FLOW MONITORING USING FLOW CONTROL DEVICE

BACKGROUND OF THE INVENTION

This application claims priority to provisional application U.S. Ser. No. 60/507,184, titled "Flow Monitoring Using Flow Control Valve", filed Sep. 29, 2003.

The flow rate of a fluid into a process is important for many applications, because it provides useful information to both the user of the fluid in an application and the supplier of the fluid. For cryogenic fluid applications knowing the flow rate into an application will allow the user to know the amount and costs in real time for the use of the fluid. Today, the user waits for an invoice after refilling a cryogenic storage tank to determine past usage and to allocate costs after the fact. The user would also benefit from knowing the flow rate which would give extra information on performance of the equipment, particularly during commissioning (start-up) of the equipment. The flow rate of the cryogenic fluid indicates the refrigeration power and allows the performance of the application to be optimized to provide best efficiency. With flow rate data it will be possible to immediately demonstrate improvements made to equipment and measure savings.

The fluid flow meters that are currently available are not generally used for cryogenic fluid applications. Flow meters useful for cryogenic fluids are expensive and sophisticated pieces of equipment, and their accuracy depends on the consistency of the gas and liquid fractions of the fluid. Many flow meters are accurate for subcooled and low gas fraction two phase flows (less than 0.5% gas by weight), but are poor for higher gas fraction two phase fluids, and gas only fluids; however, in cryogenic applications, the gas and liquid fractions in the fluid may vary greatly. Due to the flow meters' high sensitivity, they are also susceptible to rough handling. Also the potential for moisture ingress is a major cause for unreliability with conventional low temperature flow metering equipment.

The nature of cryogenic flow gives rise to three distinct flow regimes: sub cooled liquid, two phase gas and liquid, and super heated gas. Flow meters are normally designed to work in one of these regions. To maintain good accuracy the flow meters are complex, sensitive and expensive, but their accuracy can be poor and highly variable when the gas and liquid fractions of the cryogenic fluid vary beyond the gas and liquid fractions that the meters are designed for.

Current flow meters include those that measure the flow directly using the velocity and density of the fluid, and those that measure the flow indirectly using properties such as pressure drop and fluid modeling equations. The flow meters that measure the flow directly are complex meters. They are accurate for their design conditions. Examples of these meters are disclosed in U.S. Pat. Nos. 4,835,456, 3,635,084, 4,272,982. Flow is measured using a moving part (e.g. a turbine) to find the fluid velocity directly. They are susceptible to the stability of the gas and liquid fractions of the cryogenic fluid and can have poor accuracy for high gas fraction cryogenic fluids.

Non-cryogenic indirect measurement flow meters include Pitot tubes, and the Venturi's and orifice plate meters. They rely on finding the pressure drop and using it in flow modeling equations, for example Bernoulli's equation. For two phase flow more complex flow modeling is required and is very dependent on the gas and liquid fractions of the cryogenic fluid. An example can be found in U.S. Pat. No. 4,168,624.

Other examples of flow meters measure flow using electronic means (e.g. capacitance) to find the fluid velocity, such as those flow meters disclosed in U.S. Pat. Nos. 4,509,366, and 5,861,755. They are susceptible to the stability of the gas and liquid fractions of the cryogenic fluid and can have poor accuracy for high gas fraction cryogenic fluids.

A third group of flow meters arises where the fluid is split into its gas and liquid phase, each phase has its flow rate measured using one of the techniques above and the total flow is found by summing the two. Examples of these flow meters are found in U.S. Pat. Nos. 4,881,412 and 5,679,905. They are complex and expensive as they require two or more flow meters to measure the total flow.

There is a need in the art to provide a better way to measure the flow rate of a cryogenic fluid.

BRIEF SUMMARY OF THE INVENTION

This invention provides a method of determining the flow rate of a fluid, having a liquid fraction and a gas fraction, comprising the steps of: measuring the pressure and temperature of said fluid at a flow control device through which said fluid passes; inputting said measured pressure and $C_v$ into an algorithm; and performing a single or multi-step iteration to determine a fluid mass flow rate of the fluid through said flow control device using said algorithm that relates the mass flow rate of said fluid to said $C_v$, and mass densities of said liquid fraction and said gas fraction of said fluid which are a function of said measured pressure, and temperature.

This invention further provides a system comprising a source of fluid having a liquid fraction and a gas fraction, one or more flow control devices, one or more apparatuses, means for measuring temperature and pressure at said one or more flow control devices, a pipe comprising one or more pipe portions in fluid communication with said source and at least one of said one or more apparatuses, an algorithm, means for inputting said measured pressures and $C_v$ for each of said one or more flow control devices into said algorithm; and means for performing a single or multi-step iteration to determine a mass flow rate of the fluid to said one or more apparatuses using said algorithm that relates the mass flow rate of said fluid to said one or more apparatuses to said $C_v$ for each of said one or more flow control devices and mass densities of said gas fraction and said liquid fraction of said fluid which are a function of said measured pressures and temperatures.

The system and method of this invention can be used for continuous, or semi-continuous, or on-demand (i.e. when needed or desired) measurement and calculations of the mass flow rates and/or of the mass fractions of a fluid, e.g. a cryogenic fluid which comprises liquid and gas fractions. This invention is applicable to any fluid comprising liquid and gas fractions, including cryogenic fluid. The temperature(s) may be inputted into the algorithm during the inputting step and/or used to determine properties of the gas and liquid fractions and the values of properties may be inputted into the algorithm.

This invention further provides a method of determining the use of a cryogenic liquid and gas mixture on a continuous or semi-continuous basis comprising the steps of: measuring the pressure and temperature of said liquid and gas mixture at a valve through which said cryogenic liquid and gas mixture passes ($P_{valve}$ and $T_{valve}$); measuring the percent opening for said valve; inputting the $P_{valve}$, $T_{valve}$, $C_v$, and percent opening of the valve into an algorithm, and performing a single or multi-step iteration to determine the fluid mass flow rate of the cryogenic liquid and gas mixture using said algorithm that relates the mass flow rate to $C_v$, vapor pressure and mass densities of the gas and liquid mixture which are a function of the pressure and temperature of the liquid and gas mixture.

This new invention answers the need for determining, mass flow of a fluid to an apparatus with limited additional cost, because flow measurement is possible using a control valve or other flow control device. The invention provides a reliable, robust, inexpensive and effective method of measuring flow for cryogenic fluids having any gas and liquid fractions. It will allow a method and system of flow measurement to be added and installed to most applications at minimal extra cost.

The simplicity of the invention means that the measurement calculations may be performed in the valve controller, PLC, computer, server, supervisory control data and acquisition (SCADA) industrial controller, or the like. Existing applications may be easily retrofitted with this technology, because for most, if not all, installations there will be a control valve or other flow control device in the pipe connecting the apparatus to the fluid source.

This invention can be used to provide reliable information on flow to both the end user and the supplier of a two phase fluid, for example a cryogenic fluid. It will allow the user to monitor production efficiency and make the necessary adjustments to improve it. It is particularly useful for systems that comprise multiple apparatus that use cryogenic fluid from a single fluid supply and/or storage source.

This invention will be described with reference to one embodiment using a cryogenic fluid; however, it can be used and adapted to any system in which measurement of the mass flow rate of a fluid comprising liquid and gas fractions is desired.

DETAILED DESCRIPTION OF THE INVENTION

Figure 1:
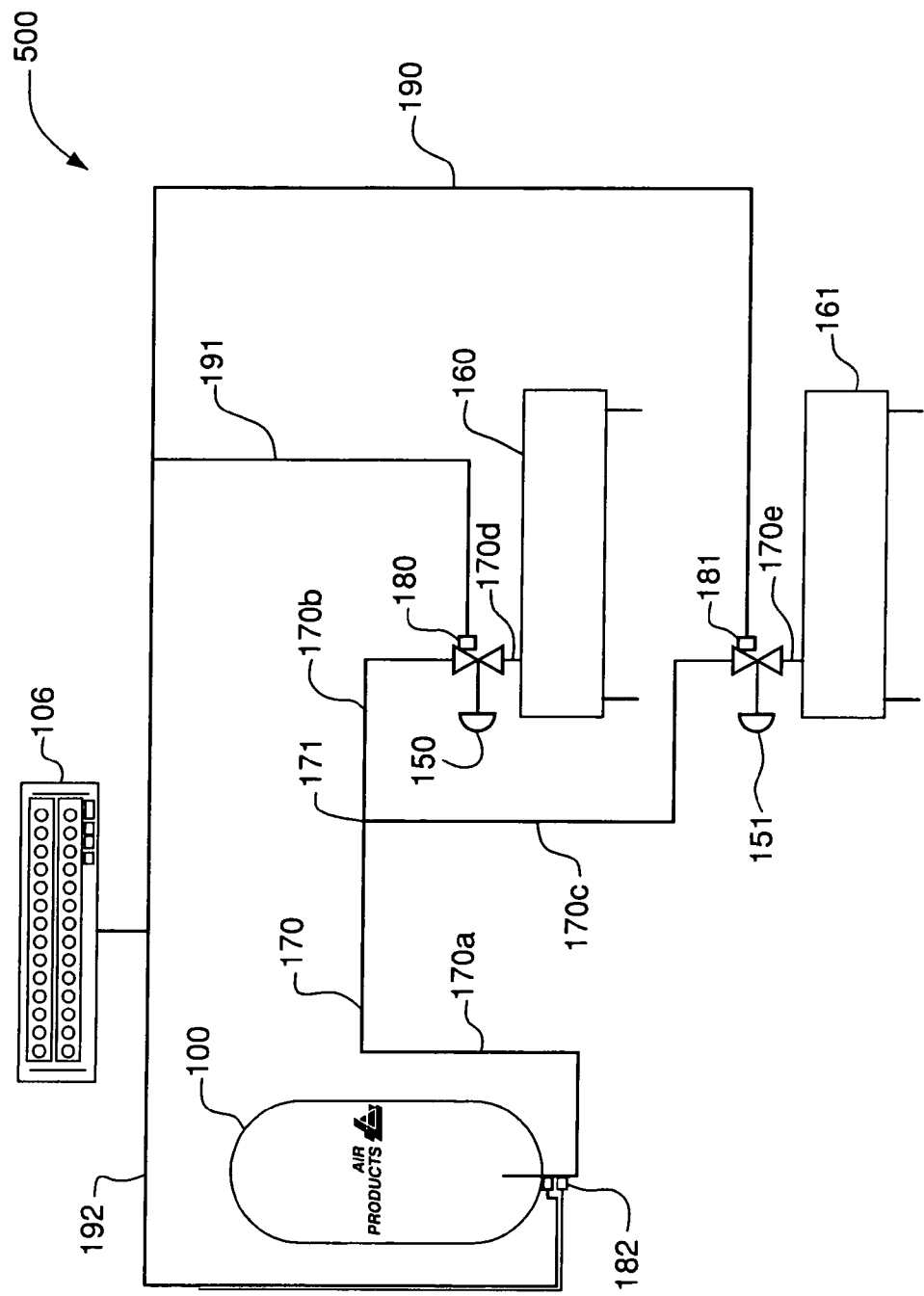
FIG. 1 shows one embodiment of the system of this invention.

One embodiment of the method and system of this invention is designed to operate for any standard cryogenic system that uses a source of cryogenic fluid, one or more apparatuses that use the cryogenic fluid from the source, one or more flow control devices positioned near the one or more apparatuses, and a pipe comprising one or more pipe portions in fluid communication with the source for the cryogenic fluid, the one or more flow control devices and the one or more apparatuses. The one or more flow control devices may be valves (e.g. variable position, on/off, or solenoid valves), each having a known flow coefficient, or are valves or other flow control devices for which flow coefficient(s) can be determined. A flow coefficient, $C_v$, is a dimensionless number that is related to the amount of fluid or gas that can pass through a valve under certain conditions of temperature and pressure when open, and for variable position valves when open a known amount. For purposes of example and for one embodiment of this invention, the valve flow coefficient, $C_v$, may be defined as the amount of water at 60° F., in gallons per minute, that will pass through a fully open valve with a 1 psi pressure drop. As described later herein $C_v$ can be determined for other flow control devices other than valves. The invention will be described with reference to embodiments in which the flow control device(s) is(are) valve(s); however, it is understood that one or more flow control devices can be substituted for the one or more valves described herein.

One embodiment of the method and system of this invention uses an algorithm to calculate the mass flow rate of a cryogenic fluid from a cryogenic fluid source to one or more apparatuses. The flow is calculated using an equation or equations that define the $C_v$/Flow characteristics for sub cooled, two phase, and superheated fluids. These types of equations will be referred to as $C_v$ Equations. An example of such an equation can be found in "Masoneilan's Control Valve Sizing and Selection Handbook" and is as follows:

The fluid mass flow rate, (Equation 1)

$$w = \frac{27.3 C_v F_p}{\sqrt{\frac{f_l}{\Delta P_l \gamma_l} + \frac{f_g}{\Delta P_g \gamma_g Y^2}}}$$

The $C_v$ term used in the equation is the product of the $C_v$ for the valve and the percentage opening of the valve measured by an instrument mounted on the valve or a signal from the valve controller. Unless otherwise specified, $C_v$, as used herein, can mean either the flow coefficient of the flow coefficient multiplied by the percent opening of the flow control device. The values $f_l$ and $f_g$ represent the liquid and gas mass fractions respectively in a two-phase fluid. For liquid only $f_l=1$ and for gas only $f_g=1$, and $f_l+f_g=1$. $f_l$ and $f_g$ are dimensionless. w is weight (mass) flow rate of two-phase mixture in units of kg/hour. The additional variables are defined as follows:

$F_F$=liquid critical pressure factor;

$F_L$=liquid pressure recovery factor;

$F_K$=ratio specific heats factor, dimensionless;

$F_P$=piping geometry factor (reducer correction);

$\Delta P_l$=pressure drop for the liquid phase, in units of bar;

$\Delta P_g$=pressure drop for the gas phase, in units of bar;

x=pressure drop ratio factor;

$x_T$=limiting pressure drop ratio factor;

Y=gas expansion factor, $$Y = 1 - \frac{x}{3 F_K x_T} \quad \text{(Equation 1A)}$$

$\gamma_l$=specific weight (mass density) of the liquid phase at inlet conditions, in units of kg/m³;

$\gamma_g$=specific weight (mass density) of the gas or vapor phase at inlet conditions, in units of kg/m³;

$P_V$=Liquid Vapor Pressure (in bar);

$P_C$=Liquid Critical Pressure (in bar)

$F_L$, $F_P$, x, and $x_T$ are physical properties of the control valve and may be found from a valve data manual, such as supplied by valve manufacturer.

$P_C$, $P_V$, $F_K$, $\gamma_l$, and $\gamma_g$ are physical properties of the fluid determined by tabulated data that can be found in a Chemical Engineering Handbook, such as Perry's for example.

$$F_F = 0.96 - 0.28\sqrt{\frac{P_V}{P_C}} \quad \text{(Equation 1B)}$$

$$\Delta P_l \text{ is limited to } F_L{}^2 (P_1 - F_F P_V) \quad \text{(Equation 1C)}$$

$$\Delta P_g \text{ is limited to } F_K X_T P_1 \quad \text{(Equation 1 D)}$$

where $P_1$ is the upstream pressure measured just prior to the valve. Note that Equations 1C and 1D can be used to determine the maximum values for $\Delta P_l$ and $\Delta P_g$ if only $P_1$ (also referred to as $P_{fcd}$ and $P_{valve}$) is measured, and that the measurement of $P_2$ is optional, and not necessary to perform the method and system of the invention.

Other examples of $C_v$ Equations that can be used in this invention to calculate the mass flow rate include the following:

$$C_v = \frac{w}{27.3 F_p \sqrt{(P_1 - P_2)\gamma_1}} \quad \text{(Equation 2)}$$

where the variables are the same as defined above and $P_2$ is defined below; and derivatives of the Badger Meter valve sizing equations (as per the Badger Meter, Inc Control Valve Sizing Bulletin):

| Liquid | Gas |
|---|---|
| $C_v = GPM\sqrt{\dfrac{S.G.}{\Delta P}}$ | $C_v = \dfrac{SCFH\sqrt{(460 + °F)S.G.}}{1360\sqrt{P_1 \times \Delta P}}$ | where
$C_v$=valve flow coefficient;
SCFH=standard cubic feet per hour;
GPM=US gallons per minute;
$P_1$=upstream pressure in PSIA;
$P_2$=downstream pressure in PSIA;
$\Delta P$=pressure drop or differential ($P_{1-2}$) in PSI (across the valve)
S.G.=specific gravity relative to air or water
° F.=fluid temperature at the valve in ° F.

Derivatives, adaptations or alternatives of these equations relating the $C_v$ to the fluid flow characteristics could be used in the method and system of this invention. For example, although $C_v$ is normally associated with a valve and its characteristics, in a further embodiment of this invention, as described above, the $C_v$ Equations above could also be used to determine 2 phase fluid flow through other flow control devices, such as orifices, holes, open ended pipes, nozzles or in fact any type of flow/flow control restriction device. The term "flow control device" will be used to generally refer to any of those devices including valves. By using a method to determine the equivalent $C_v$ of such a flow control device and measuring the required conditions described by this invention at the flow control device (e.g. $P_{fcd}$ and $T_{fcd}$) the mass flow could be calculated in an algorithm modified for that flow control device.

For example, from any nozzle manufacturers catalogue (e.g. Spraying Systems, Inc) values for flow of water (liters per minute) at pressure (barg) can be measured for any flow control device and therefore the equivalent $C_v$ found using the following equation:

$$Cv = (\text{Flow} \times 60/1000)\sqrt{\left(\frac{1}{P}\right)}/0.865$$

Where
Flow=Nozzle flow lpm
P=pressure (barg).

The other variables for the valve in the algorithm described below can be determined in a similar way for the flow control device. For example, for nozzles, $F_P$ may be assumed to be equal to 1, for other flow control devices, $F_P$ may be found from manufacturers' data.

To calculate the mass flow rate using one of the $C_v$ Equations typically requires knowledge of the $C_v$ of the flow control device (e.g. valve), pressure upstream (just before the flow control device or valve), vapor pressure and also the mass fraction of gas and liquid in the fluid, and optionally the change in pressure across the flow control device (e.g. valve).

Again the invention will be described with reference to one embodiment in which the flow control device is a valve; however, that is not meant to be limiting, because the term flow control device may be substituted for any description of the valve herein.

In one embodiment the change in pressure at the valve, $\Delta P$ and the fluid temperature at the valve, $T_{valve}$ can be determined by placing a measuring sensor (or multiple sensors that can be averaged, if desired) for temperature at the valve, and pressure sensors before or after the valve to measure $P_1$ and $P_2$. The change in pressure across the valve is then calculated as $P_1$ minus $P_2$; however, $\Delta P_l$ and $\Delta P_g$ are limited to maximum values for choked flow and are given in the equations above (Equations 1C and 1D). Using the measured temperature $T_{valve}$, the vapor pressure ($P_V$) of the fluid may be calculated. Comparing the vapor pressure with the actual pressure $P_1$ will determine the condition of the fluid as sub cooled, mixed liquid/gas, or superheated gas. For a cryogenic 100% liquid or a cryogenic 100% gas, with the measurements of the $T_{valve}$, $P_1$ and $P_2$ and calculating $\Delta P$ all the variables in the $C_v$ Equation are known, and the mass flow rate can easily be calculated using the $C_v$ Equation. In thermodynamic terms, outside the saturation line on a phase diagram, the pressure and temperature are independent and will define the state (and hence all the properties of the fluid). However, inside the saturation line on a phase diagram, where the fluid consists of liquid and gas, the pressure and temperature are dependent, and a $C_v$ Equation cannot be used to calculate the mass flow rate, because there are too many unknown variables (e.g. $f_l$, $f_g$). The mass fraction of the liquid or gas inside the saturation line must therefore be determined by another means. The method presented here is a technique that allows a $C_v$ Equation to be used to calculate mass flow rate in pipes in which fluids, consisting of all liquid, all gas, or liquid and gas fractions, are flowing.

The quality of the fluid could be measured directly at each flow control device using a quality measurement instrument using such techniques as capacitance, di-electric, ultrasound or the like, but presently these instruments are expensive and unreliable. So if such an instrument is not used at each flow control device, at least one additional relationship between the variables needs to be defined to help solve the $C_v$ Equation. One such relationship that can be used in the algorithm of this invention is that the mass fraction of the fluid at the valve is related to the mass fraction of the fluid from the source and the heat inleak into the pipe (heat that is input into the pipe that causes a phase change to a portion or all of the fluid), and the flash loss in the pipe (gas generated due to pressure drop in the pipe) between the source and the valve. (Note that for most cases the fluid at the source will be 100% liquid; however, this invention is also useful for cryogenic or other fluids that are a gas/liquid mixture or 100% gas at the source.) The heat inleak is related to the length of the pipe, and type of insulation of the pipe. The flash loss is related to the enthalpy change of the fluid within the pipe from the cryogenic source to the valve. However, the heat inleak is also a function of the unknown mass flow rate, and the gas and liquid fractions of the fluid, which are unknown. However, the algorithm of this invention can perform an iterative calculation to determine (or closely approximate) the mass flow rate using the $C_v$ Equation and the relationship between the heat inleak and enthalpy change to the fluid in the pipe from the source to the valve.

The iterative calculation begins with assuming that the fluid at each of the valves located relatively closely to the one or more apparatuses that use the cryogenic fluid is 100% liquid. Alternatively, the fluid could be assumed to be a certain fraction of gas or liquid or all gas depending upon the system and the fluid.

The iterative calculation will be described with reference to FIG. 1 showing systems of the invention, and FIGS. 2–4, which together are a flow diagram for one embodiment of the computer algorithm (method) of this invention.

The system 500 shown in FIG. 1 consists of a cryogenic fluid source 100, apparatuses 160, 161 a control valve 150 located near apparatus 160, a second control valve 151 located near apparatus 161 and pipe 170. Both apparatuses 160, 161 are in fluid communication with source 100, via pipe 170. Pipe 170 consists of pipe portions 170a, 170b, 170c, 170d and 170e. From source 100, pipe portion 170a branches at point 171 into pipe portions 170b and 170c. Pipe portion 170b is connected to control valve 150, which communicates with apparatus 160 via pipe portion 170d. The source 100 is connected to apparatus 161 via pipe portion 170a that branches at point 171 into 170c, connects with control valve 151 and is connected to apparatus 161 via pipe portion 170e.

The source 100 is shown as a storage tank, but can be any cryogenic fluid source or other fluid source, such as, a portable vessel/container, road tanker, trailer, chemical production facility, or liquid air separation plant or multiples of the above sources. The pipe portions of pipe 170 are usually well insulated with vacuum jacketing super insulation or other insulation, such as, foam, polyurethane, polystyrene, foam-glass or the like. Each pipe portion is considered separately, because the insulation of the pipes and lengths of the pipe portions vary. The apparatuses 160, and 161 can be any device, equipment, or process that uses the fluid, such as a cryogenic fluid, such as a freezer tunnel, batch chiller, cryogenic grinding machine, de-flashing machine, solvent recovery equipment, or heat exchanger. Connected to the pipe 170, the system 500 further comprises sensors 182 located close to the outlet of the cryogenic fluid from the source 100. The sensors 182 measure at least the temperature and pressure. The temperature may be measured using a platinum resistance device, or thermocouple, however, alternative temperature measuring devices can be used if desired. The pressure may be measured using a pressure probe/transmitter/transducer; however, alternative pressure measuring devices can be used if desired. These temperature and pressure measuring devices are affixed or otherwise connected to the pipe 170 to provide actual fluid information. Sensors 180 are present on the control valve 150. Sensors 180 measure at least temperature $T_{valve}$ and pressure upstream of the control valve 150, and preferably the downstream pressure, meaning the pressure just prior to ($P_1$) and just after ($P_2$) the control valve, respectively. To make these measurements sensors for pressure and temperature should be located a short distance, e.g. less than 100 centimeters away from the control valve. Sensors 180 also include the measurement of the actual valve position that is the percent opening of the valve, or percent opening of the valve multiplied by the $C_v$ for the valve. (For other flow control devices, that have a fixed opening, the step of measuring the percent opening will not apply.) The valve position may be measured using a linear position transducer, feedback transducer or similar device; however, alternative position measurement devices can be used if desired or required. Valve position may also be known from the electronic or pneumatic signal to the control valve, or manually determined and inputted into the computer.

Sensors 181 are present on the control valve 151. Sensors 181 measure at least the temperature and pressure upstream of the control valve 151, and preferably the downstream pressure, as described above for sensors 180. Sensors 181 also include the measurement of the actual valve position (percent opening of the valve), if applicable as described above for sensors 180. Each group of the sensors 182, 181 and 180 transmits its generated signals to a device 106, shown as part of the system 500, such as, a data logger, data-recording device, programmable logic controller (PLC), valve controller, computer or any type of data storage device, or the like, which may also be capable of running the algorithm or communicating with a computer, that is capable of running the algorithm to calculate the fluid mass flow rate. The means of transmission, as shown, from the sensors 182, 181, and 180 are wires 190, 191, and 192. Alternatively, the transmission could be via wireless communication device, a network, IR link and/or by a similar communications transfer protocol. The sensors may transmit to the device 106 continuously, semi-continuously, or on-demand, and the device 106 can be programmed to continuously, semi-continuously or on-demand calculate (or have calculated) the mass flow rate through the valves in the system when the cryogenic fluid is being used in the apparatus(es). Continuous measurements and calculations are limited by the time it takes to make the measurements and/or perform the calculations. Semi-continuously can be any amount of time, e.g. every minute or every 5 minutes the measurements are made and/or the calculations are performed. Any measurements taken by the sensors may be read in real time or stored in a database file with a time stamp and later inputted from the database file and used for calculating the mass flow of the fluid. Alternatively, the measurement by the sensors and/or the calculation using the algorithm can be controlled manually, or performed only at start-up, or at any other desired interval or times. Alternatively, the calculations may be performed if the temperature and pressures are not within a set range. If desired, the calculated mass flow rates can be used to determine the real-time usage of cryogenic fluid by apparatuses 160, 161. Alternatively, sensors could be provided on the equipment to store and transmit this data, or it could be stored in a database that could be accessed by the algorithm. In one embodiment, the device 106 is programmed to calculate the mass flow rate through the valves using the temperature and pressure data measured and communicated by the sensors using the iterative method (the algorithm) which was described above, and will be described in greater detail with reference to FIG. 2, 3, and 4 as follows.

Figure 2:
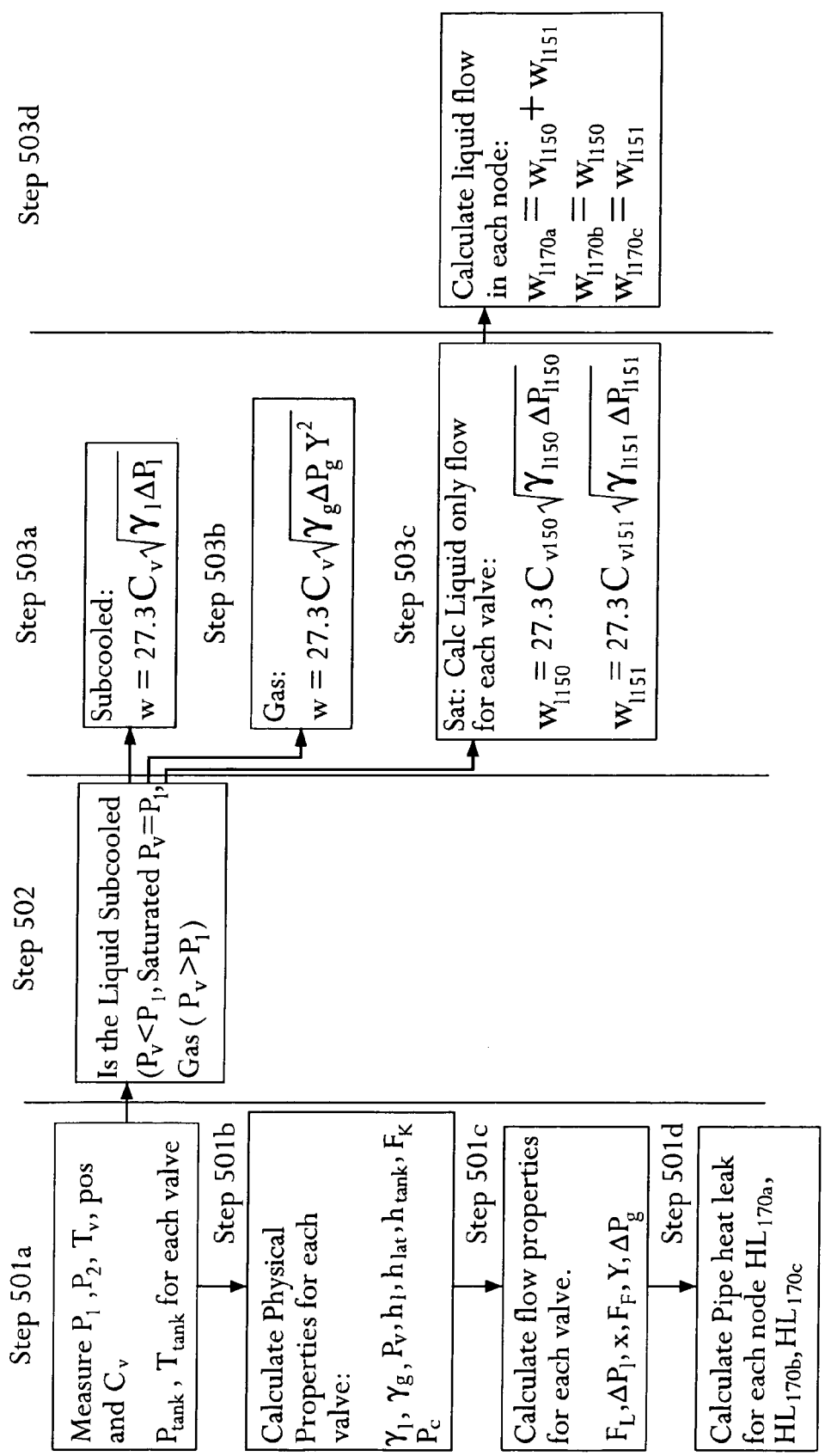
FIGS. 2–4 show one embodiment of the method of this invention.
Figure 3:
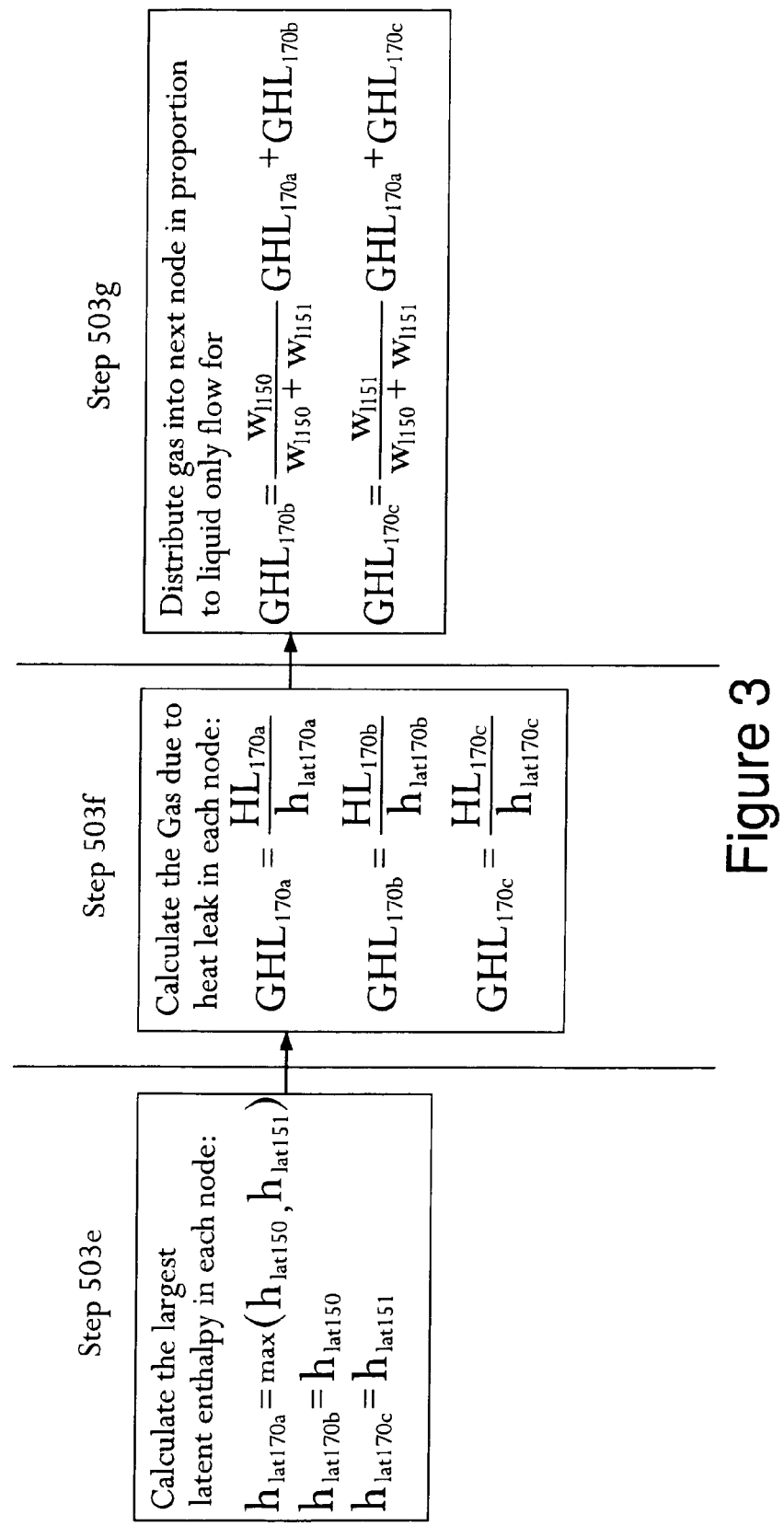
Figure 4:
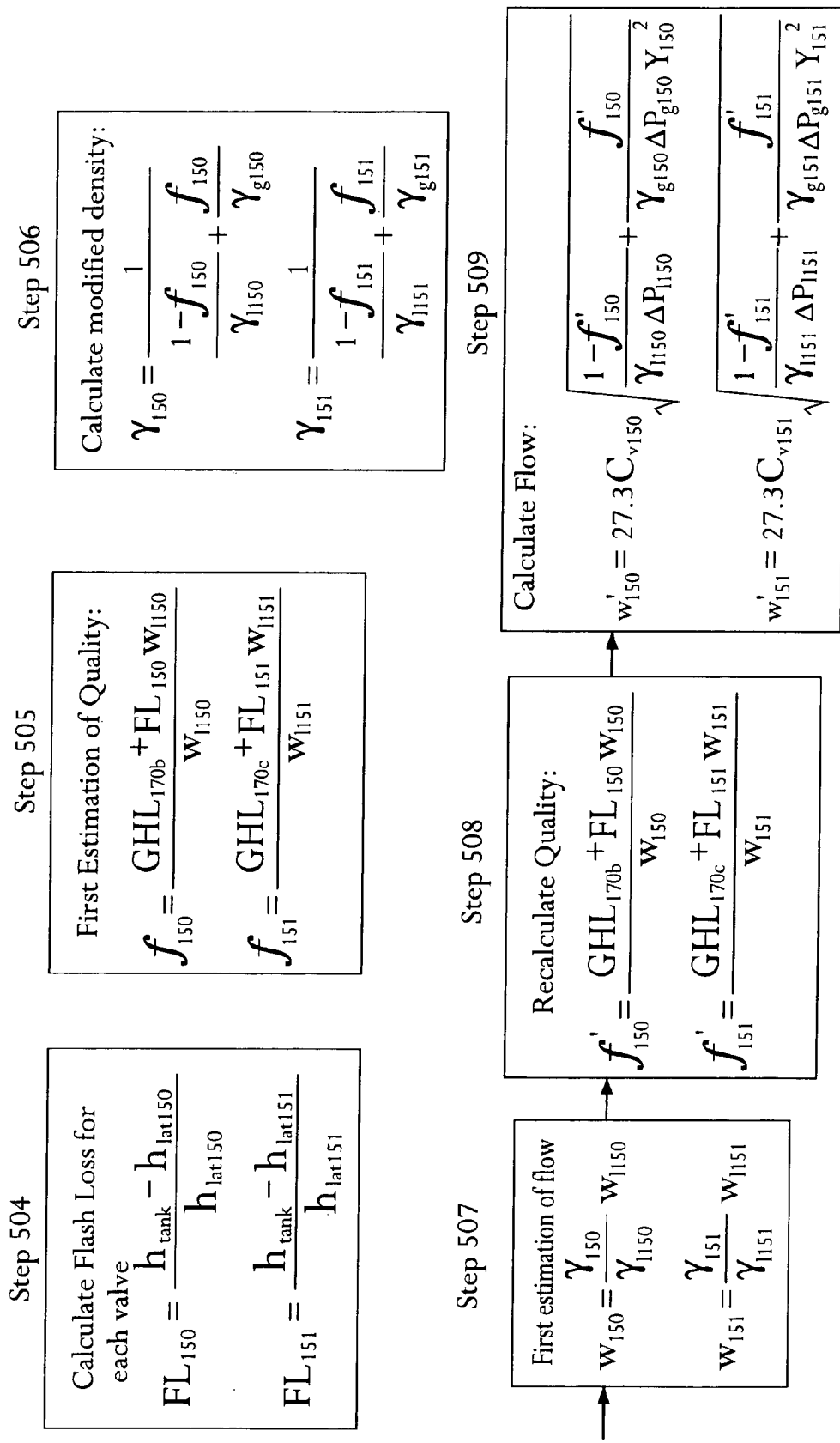

For the just-described system shown in FIG. 1, the process steps for the algorithm are shown in FIGS. 2, 3, and 4.

The variables in FIGS. 2, 3, and 4 have the following meanings:

Subscripts I and g define liquid and gas phases, respectively;
Numerical subscripts define which node or valve is referenced;
$h_l$ is the liquid enthalpy of the fluid (in kJ/kg/° C.);
$h_{lat}$ is the latent enthalpy of the fluid (in kJ/kg/° C.);
$h_{tank}$ is the enthalpy of the fluid at the source (in kJ/kg/° C.);
f is the mass gas fraction of the fluid (fraction 0=all liquid, 1=all gas);
$P_1$ is the upstream pressure at the valve (in bar);
$P_2$ is the downstream pressure at the valve (in bar);
$P_{tank}$ is the fluid pressure at the source;
$T_{valve}$ is the fluid temperature upstream of the valve (in ° C.);
$T_{tank}$ is the fluid temperature at the source (in ° C.);
HL is the heat inleak into each node in (kJ/h);
GHL is the gas generated due to heat inleak (in kg/h);
FL is the flash loss (in %); and
pos is the position of the control valve.

All other variables are defined as per the equation described above for Equation 1.

In the embodiment of the algorithm shown in the Figures, the algorithm was written including the definition of the length or lengths of the pipe between valves and branches in the pipe for the distribution of cryogenic fluid to the apparatuses, the insulation type and heat-leak values for all the pipe lengths (portions), the $C_v$ for each valve, and the location of the valves and branches in the pipes. (Alternatively, sensors could be provided on the equipment to read, or store and transmit this data, or this data could be stored in a database that could be accessed by the algorithm). Therefore in the method of this invention, unless otherwise specified, the step of inputting information includes: inputting the information from the sensors in the system, inputting the information from another database, and/or accessing information previously defined and stored within the algorithm.

At step 501a, for each control valve through which fluid is flowing for our example control valves 150 and 151, from sensors 180 and 181 the upstream $P_1$, $T_{valve}$, downstream $P_2$, and current valve position (pos) for each valve are read and via sensors 182, the $P_{tank}$, and $T_{tank}$ are read and all the values are inputted into the algorithm. In step 501b, the data collected in step 501a for each valve is used to calculate the fluid physical properties: density of the liquid, $\gamma_l$, density of the gas, $\gamma_g$, the vapor pressure, $P_v$, enthalpy of the liquid, $h_l$, the latent enthalpy $h_{lat}$, at each of the valves, the enthalpy of the fluid at the source (e.g. at the tank), $h_{tank}$, the liquid critical pressure $P_c$ and the ratio specific heats factor $F_K$ based on tabulated or polynomial data for the fluid from an engineering handbook. (Even though for the first iteration, the assumption is that the fluid is 100% liquid at the valves, the density of the gas, $\gamma_g$, is determined at the measured $P_1$, and $T_{valve}$, because the value will be used in step 506 which will be described below.) In step 501c, further calculations are performed to determine $\Delta P_g$, $\Delta P_l$, $F_F$, and Y using Equations 1A, 1B, 1C and 1D. $\Delta P_g$ is the change in pressure of the gas phase across the valve. (For the first iteration this is 0). $\Delta P_l$ is the change in pressure of the liquid phase across the valve, which for the first iteration is $P_1$ minus $P_2$. $F_L$, and x are typically provided by the valve manufacturer for each valve, and are defined in the algorithm for each valve. For some or all of the variables of the fluid that are temperature and pressure dependent, one or more separate algorithms, having for examples, look up tables, or formulas, may be provided to determine values for the variables and then those values may be inputted into the algorithm used to determine the mass flow rate of the fluid. Alternatively, subroutines having for examples, look-up tables or formulas, may be imbedded into the algorithm (used to determine the mass flow rate of the fluid) to determine the values for the variables.

In step 501d, further calculations are then performed to determine the heat inleak values for the pipe portions. For a single apparatus supplied by a single source, this is relatively easy however for multiple apparatuses connected to a single source via branching pipes, the calculation is more complicated. For this, the distribution system is split into pipe portions or nodes. For valve 150, the pipe includes pipe portions 170a and 170b as shown in FIG. 1. For valve 151, the pipe includes pipe portions 170a and 170c. The heat loss, HL, for each of the pipes connecting the source to the control valve for the apparatus is calculated by summing the insulation factor multiplied by the length for each portion of the pipe.

In step 502, a check is performed to determine if the fluid at each valve is a sub cooled liquid, a superheated gas or a mixture of liquid and gas. If the fluid is a sub cooled liquid, the $C_v$ Equation shown in step 503a is used to calculate the mass flow rate. If the fluid is gas, then the $C_v$ Equation shown in step 503b is used to calculate the mass flow rate. If the fluid is only a sub cooled liquid or only a gas, then the calculation is complete after step 503a or 503b. If the fluid is a mixture of a liquid and gas, and the ratio of liquid and gas in the fluid were known at each valve, then the equations shown in step 509 could be solved simultaneously to calculate the mass of the liquid and gas respectively at each valve and the calculation would be complete. Since the ratio of liquid and gas at the valves is unknown, for the first iteration, the fluid is assumed to be 100% liquid at each of the valves 150 and 151. The liquid mass flow rates, $w_{l150}$ and $w_{l151}$, are calculated using the $C_v$ Equation shown in step 503c for each of the valves 150 and 151, respectively.

Then, in step 503d, the liquid flow rate in all the pipe portions (nodes) are calculated. In this case the mass flow rate in pipe portion 170a, $w_{l170a}$ equals $w_{l150}+w_{l151}$.

In step 503e the latent enthalpy for each node is determined from the maximum latent enthalpy $h_{lat}$ value of the flows, $h_{lat150}$ or $h_{lat151}$ in that node. For a node that splits into 2 or more nodes and does not have a valve therein for which the $h_{lat}$ has been determined, then the $h_{lat}$ for that node is set at the highest value for $h_{lat}$ for the nodes into which the node has split into. This is shown in FIG. 3 in step 503e, $h_{lat170a}=\max(h_{lat150}, h_{lat151})$.

In step 503f, the gas that will result from the heat inleak in each pipe portion or node is calculated using the formula shown in FIG. 3. The heat loss for each node was determined in step 501d. The latent enthalpy was determined in step 503e.

In step 503g, the gas $GHL_{170a}$ is distributed into subsequent nodes based on the flows calculated in step 503d, and new values for gas due to the heat inleak $GHL_{170b}$ and $GHL_{170c}$ are calculated by adding the just-described value to the values calculated for $GHL_{170b}$ and $GHL_{170c}$ in step 503f.

In step 504 the flash loss for each valve is calculated from the latent heat at the source and the valve using the $h_{tank}$ and $h_{lat150}$ and $h_{lat151}$ values determined in step 501b.

Then in step 505, using the values for flash loss and gas due to heat inleak calculated in step 503g and 504, and the mass flow rates calculated in step 503c, the gas fractions, f, of the fluid at each of the valves 150 and 151 are calculated.

In step 506, using the gas fractions that are calculated in step 505 for each of the valves 150 and 151, and the densities of the liquid and gas from step 501b, a new modified density is then calculated for the fluid at valves 150 and 151.

In step 507, the first estimation for mass flow rate at each of the valves is recalculated using the initial mass flow rate $w_I$ that was calculated in step 503c for each of the valves, the density for the liquid at each valve that was calculated in step 501b and the modified density calculated at each valve calculated in step 506.

In step 508, using the flash loss and heat inleak data that was calculated in steps 503g and 504, and the mass flow rates, w, that were calculated in step 507, the gas fraction of the fluid at the valve, f', for each valve is recalculated.

Then, in step 509, the final mass flow rate at each valve is recalculated using the gas fraction f' calculated in step 508, using the $C_v$ Equation with all other input values either as previously determined or calculated within the algorithm.

Actual results of performing the algorithm as described above and shown in the Figures, indicated that by performing the steps of the algorithm one time from step 501 through to step 509, produced the desired accuracy for most system applications, however, repeating portions of the algorithm such as repeating steps 508 and 509, or using the w calculated in step 507 and repeating the algorithm from step 503d through step 509, or repeating other alternative sections of the algorithm using the results calculated from the preceding iteration can be performed, if desired, to calculate a more accurate value.

The embodiment shown in FIG. 1 with the method steps (algorithm) described in FIGS. 2, 3, and 4 pertains to a single source of cryogenic fluid and 2 apparatuses that use the fluid from the source. The algorithm can be adapted to any pipe setup and for any number of apparatuses in fluid communication with one or more cryogenic fluid sources by amending the algorithm to include them, which given the teaching herein can be done by a person of ordinary skill.

Figure 5:
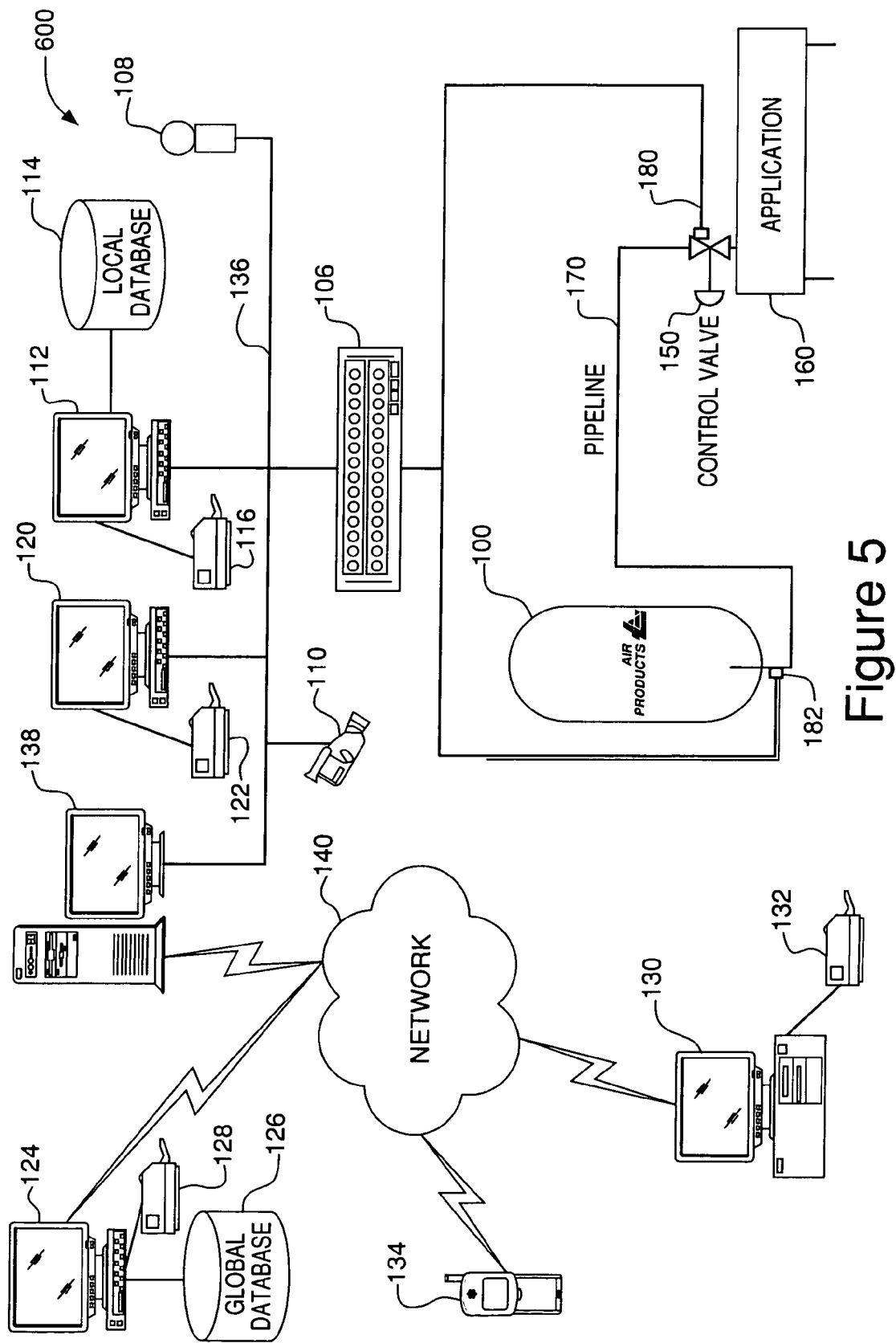
FIG. 5 shows an alternative embodiment of the system of this invention.

Another embodiment of the invention is shown in FIG. 5. FIG. 5 shows a system 600 of the invention. Like equipment in FIG. 1 and FIG. 5 is labeled the same. FIG. 5 differs from FIG. 1 in that FIG. 5 shows only a single apparatus 160; however, it is understood that the method and system of this invention is most useful for and can be tailored for any number of apparatus receiving cryogenic fluid from a source of cryogenic fluid.

As shown in FIG. 5 the sensors 180 transmits generated signals to a programmable logic controller (PLC) 106. In this embodiment, the PLC 106 serves as an intelligent portal on a network 136 through which the signals from the sensors 180, 182 pass to be stored on a local database 114 or transmitted across various networks 136 or 140 for storage on a remote global database 126 and 140 for viewing by various personnel on personal computers, terminals, and workstations 112, 120, 124, and 130. Each of the devices residing on the network 140 if properly authorized can receive sensor data, and access to the calculated mass flow rates, from the PLC 106 through a secure access server 138.

Additionally, sensor signals or the server 138 can also be accessed by means of portable devices 134, such as cell phones and personal digital assistants. The networks 136 and 140 can be any combination of hard-wired and wireless networks including local area networks, wide area networks, private networks, public networks intranets, extranets, and the internet. Access across the networks can be though a dial-up network telephone line a wireless link, a hard wired connection, or any combination thereof. Remote access to the system is available by any number of known communication protocols including wireless. The system of this invention can comprise any combination of the devices shown in FIG. 5 and anticipates the capacity to provide for a means for a person accessing the network to change the flow rates or other characteristics of the equipment in response to the information from the sensors.

The PLC 106 or computers may be programmed to calculate the mass flow rate through the valve using the temperature and pressure data measured and communicated by the sensors; however it is presently preferred that the PLC transmit the data measured by the sensors to an offsite server that will be programmed to calculate the mass flow rate through the valve to the apparatus.

The sensors may transmit to the PLC continuously, semi-continuously, or when requested or otherwise programmed and the PLC or offsite server can be programmed to continuously, semi-continuously, or otherwise as requested, calculate the mass flow rate through the valve. The calculated mass flow rates can be used to determine the usage of cryogenic fluid by the apparatus. This information can be used to determine the proper allocation of costs for what the apparatus is being used for. For example, if the apparatus is a food freezer, the amount of cryogenic fluid used to freeze the food can be calculated as the food passes through the freezer and the costs for freezing the food can be properly allocated to the particular food after freezing it. This is particularly beneficial when multiple freezing apparatuses freeze multiple products yet use cryogenic fluid from a single source of cryogenic fluid. For that set-up this invention allows the cost of freezing each individual product to be known. In the past, the usage of the cryogenic fluid by a particular piece of apparatus would have to be approximated. It is additionally beneficial to measure the mass flow rate of the cryogenic fluid used by each apparatus, because then the optimization of the process becomes easier.

The algorithm could be part of a larger algorithm or program that could calculate the running costs of the use of the cryogenic fluid, and allocate those costs to the use of the fluid by weight of food product frozen or if the cryogenic fluid is used in a freezing apparatus or by weight of material ground if the cryogenic fluid is used in a cryogenic grinding apparatus, for examples to help the user offer more accurate pricing based on actual use of the cryogenic fluid to its customers. Additionally, the algorithm could be used to notify the user and supplier when to schedule the next delivery of cryogenic fluid or when to service an air separation unit or apparatus that used the cryogenic fluid.

The invention has been described with particular reference to embodiments in which the flow rate of a cryogenic fluid are determined; however, the method and system of this invention are adaptable to determine the mass flow rate of other fluids having a liquid and a gas fraction. For example, during the production of a 2 phase fluid in a chemical plant that is used for additional processing, and also for systems in which the 2 phase fluid may be cooled (instead of heated as described above) causing a phase change from gas to liquid in the pipe lengths due to heat inleak.

The invention claimed is:

1. A method of determining the flow rate of a fluid, having a liquid fraction and a gas fraction, comprising the steps of:
    measuring the pressure and temperature of said fluid at a flow control device through which said fluid passes;
    inputting said measured pressure and flow coefficient ($C_v$) into an algorithm; and
    performing a single or multi-step iteration to determine a fluid mass flow rate of the fluid through said flow control device using said algorithm that relates the mass flow rate of said fluid to said $C_v$, and mass densities of said liquid fraction and said gas fraction of said fluid which are a function of said measured pressure, and temperature.

2. The method of claim 1 further comprising the step of repeating said measuring, inputting and performing steps on a continuous or semi-continuous basis.

3. The method of claim 1 wherein said flow control device is selected from the group consisting of an orifice, hole, open-ended pipe, nozzle, and valve.

4. The method of claim 1 wherein said algorithm additionally relates the mass flow rate of said fluid to vapor pressure of said fluid.

5. The method of claim 1 further comprising the step of measuring a temperature and pressure at a source of said fluid.

6. The method of claim 1 further comprising the step of calculating a flash loss of said fluid through each flow control device.

7. The method of claim 1 further comprising the step of defining one or more pipe portions through which said fluid flows and calculating a heat inleak of said fluid in said pipe portions.

8. The method of claim 1 further comprising the steps of:
    calculating a flash loss of said fluid for said flow control device;
    defining one or more pipe portions through which said fluid flows;
    calculating a heat inleak of said fluid in said pipe portion; and
    calculating said gas fraction and said liquid fraction of said fluid at said flow control device using said flash loss, and said heat inleak.

9. The method of claim 1 wherein said flow control device is a valve, and further comprising the step of measuring the percent opening of said valve.

10. The method of claim 9 wherein said algorithm additionally relates the mass flow rate of said fluid to vapor pressure of said fluid.

11. The method of claim 1 further comprising the step of inputting the measured temperature into said algorithm.

12. A system comprising a source of fluid having a liquid fraction and a gas fraction, one or more flow control devices, one or more apparatuses, means for measuring temperature and pressure at said one or more flow control devices, a pipe comprising one or more pipe portions in fluid communication with said source and at least one of said one or more apparatuses, an algorithm, means for inputting said measured pressures and flow coefficient ($C_v$) for each of said one or more flow control devices into said algorithm; and
    means for performing a single or multi-step iteration to determine a mass flow rate of the fluid to said one or more apparatuses using said algorithm that relates the mass flow rate of said fluid to said one or more apparatuses to said $C_v$ for each of said one or more flow control devices and mass densities of said gas fraction and said liquid fraction of said fluid which are a function of said measured pressures and temperatures.

13. The system of claim 12 further comprising a plurality of said apparatuses, a plurality of said flow control devices, a plurality of said pipe portions in fluid communication with said source and at least one apparatus, and a plurality of said means for measuring said temperature and pressure.

14. The system of claim 12, further comprising means to repeat said iteration to calculate said mass flow rate of said fluid to said one or more apparatuses continuously or semi-continuously during a period of usage.

15. The system of claim 12 wherein said algorithm additionally relates the mass flow rate of said fluid to vapor pressure of said fluid.

16. The system of claim 12 further comprising the means for measuring a temperature and pressure at a source of said fluid.

17. The system of claim 12 wherein said means for performing calculates a flash loss of said fluid through each of said one or more flow control devices.

18. The system of claim 12 wherein said algorithm defines said pipe portions through which said fluid flows and calculates the heat inleak of said fluid in said pipe portions.

19. The system of claim 12 wherein said algorithm relates said gas fraction and said liquid fraction of said fluid to said flash loss in said one or more flow control devices, and said heat inleak in said portions.

20. The system of claim 12 wherein said flow control device is selected from the group consisting orifice, hole, open-ended pipe, nozzle, and valve.

21. The system of claim 12 wherein said means for performing is selected from the group consisting of a valve controller, PLC, computer, server, and a supervisory control data and aquisition industrial controller.

* * * * *